Jan. 29, 1935.  H. H. BROWNE  1,989,399
PROCESS FOR TREATMENT OF FRUIT JUICES
Filed June 17, 1932
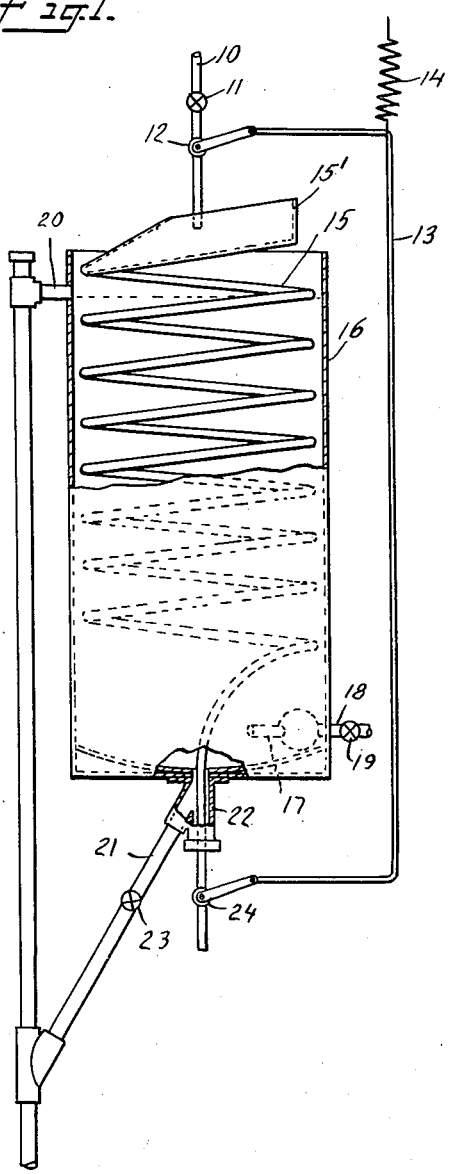
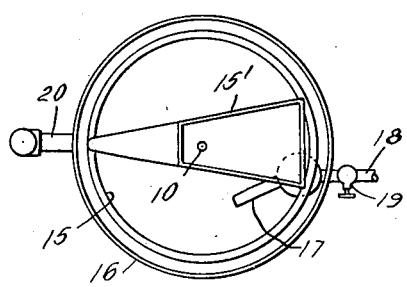
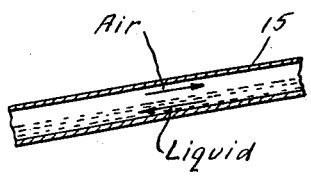
INVENTOR
Harold H. Browne
BY
Pennie Davis, Marvin Edmonds
ATTORNEYS Patented Jan. 29, 1935

1,989,399

UNITED STATES PATENT OFFICE 1,989,399

PROCESS FOR TREATMENT OF FRUIT JUICES

Harold H. Browne, Brooklyn, N. Y., assignor to The Hills Brothers Company, New York, N. Y., a corporation of New York Application June 17, 1932, Serial No. 617,706

5 Claims. (Cl. 99—15)

This invention relates to preservation of fruit juices, as, for example, the juice of citrus fruits, such as oranges and grapefruit. More particularly, the invention is concerned with a novel method of treating fruit juice so that it may be kept in sealed containers for indefinite periods without undergoing changes in taste and flavor, and with a novel apparatus by which the method may be advantageously practiced. For purposes of explanation, the use of the new method and apparatus in connection with the treatment and preservation of the juice of citrus fruits will be described in detail, although it is to be understood that the utility of the invention is not limited to that particular type of juice.

Many attempts have been made heretofore to devise a method of treating citrus fruit juice so that the juice can be extracted from the fruit at the groves and shipped to market in sealed containers, but so far as I am aware, the methods used have not been successful because they either involved a treatment which impaired the taste of the juice or else did not preserve the juice so that it would keep indefinitely without spoiling. In many of these prior methods, the juice was given a preliminary heat treatment to kill the bacteria and other organisms present which would cause the juice to become unfit for consumption, and, while such a result may be obtained by heating, the methods of heating the juice heretofore used resulted in giving the juice an unpalatable cooked flavor. However, unless the juice was heated sufficiently to destroy the organisms, it did not keep and soon turned sour.

The method of preserving fruit juice in accordance with my invention involves the heat treatment necessary to preserve the juice, but, as a result of my experiments in this field, I have discovered that the heating may be carried on in such a way as to destroy the organisms without impairing the taste and flavor of the juice. In addition to the heat treatment, I employ the acidity of a small amount of sour juice to accomplish the destruction of the organisms, making a blend of ordinary sweet juice and the highly acid juice and then offsetting the sourness of the blend by adding a small quantity of sugar in the form of a syrup.

In carrying out the method, I heat the blend of juices in a preliminary operation under such conditions that the gases and vapors evolved from the liquid by heating may freely escape, and the blend is then introduced without substantial exposure to the air into containers, such as cans, which are at once sealed. The cans are then subjected to a further heating under carefully regulated conditions of temperature and time to complete the destruction of the organisms.

The novel apparatus which forms a part of my invention provides a convenient and advantageous means for carrying on the desired heat treatment and by its use, the juice may be quickly raised to the desired temperature and discharged directly into the cans in which the juice is to be shipped, without substantial exposure.

For a better understanding of the invention, reference may be had to the accompanying drawing illustrating the novel apparatus. In this drawing, Fig. 1 is a view in vertical elevation of the apparatus, certain parts being shown in section.

Fig. 2 is a plan view of a portion of the apparatus with parts broken away, and

Fig. 3 is a diagrammatic view illustrating the use of the principle of "open channel flow" in the apparatus.

For the preservation of citrus fruit juices, I have found that, if the juice is heated under such conditions as to permit the free escape of gases and vapors, it is sufficient to raise the juice preliminarily to a temperature varying from about 155° F. to about 175° F. Thereafter the heated juice should be discharged at once and without substantial exposure to the atmosphere, into containers, which have been sterilized, and the containers sealed without delay. The containers should then be kept at a temperature of about 160° F. to about 170° F. for a period of at least ten to fifteen minutes.

In the preliminary heating, the juice should be kept out of contact with the atmosphere as much as possible and the heating should be carried on rapidly, taking only a short time, such as fifteen seconds. The final heating should be carried on for at least the time mentioned in order to obtain the desired preservation, and any longer or higher heating is likely to impair the taste and flavor of the juice.

In carrying on the new method, the juice is introduced into the top of a pipe coil which is heated, and, as the juice flows through the coil, its temperature is raised to the desired point. The coil is so constructed and the juice is introduced into it at such a rate that the juice does not fill the piping completely at any time but flows along the bottom of the piping in such a way as to leave an air space above the liquid level.

As the juice is raised in temperature in its flow through the coil, air entrapped in the juice and vapors are forced out of the juice into the air space above the juice and flow upwardly and escape from the coil to the atmosphere. The passage of the juice through the coil requires only a short period of time as, for example, 15 seconds, and the juice is discharged from the coil directly into the sterilized cans which are then sealed and heated as, for example, by being placed in hot water maintained at the desired temperature.

In the preservation of orange juice and grapefruit juice, a blend is first made by adding a small quantity of sour orange juice, the acidity of which has a toxic effect on the organisms present. Because of the addition of the sour juice, it is necessary to add sugar to keep the blend palatable and the amount of sugar added will depend on the quantity of the sour juice employed. A blend which I have found to be satisfactory may include 90% ordinary orange juice and 10% sour orange juice and for the quantity contained in a No. 1 can, about 1½ oz. of 50% sugar syrup is required. The amount of sweetening added depends both on the quantity of the sour juice employed and on the acidity thereof, but the proportions will not vary substantially from those mentioned. In the case of grapefruit juice, about 4% of sour orange juice is employed and about 1½ oz. of sugar syrup of 50% strength will be employed for 8½ oz. of juice.

The juice is extracted from the fruit either mechanically by reaming or else the fruit is scalded, peeled by hand, and treated with a lye spray to remove the white rag, after which the fruit is washed and the juice extracted by squeezing. The juice is then collected in a large vessel and the blend of juices made.

The vessel containing the blend is provided with a pipe 10 containing a flow control valve 11 set manually to regulate the rate of discharge and in this pipe is a shut-off valve 12 operated by a handle 13 acted on by a spring 14 and normally keeping the shut-off valve closed. The pipe 10 discharges into a funnel 15' connected to the top of a pipe coil 15 which lies within a vessel 16. Means are provided for heating the coil, and for this purpose, the vessel may contain water which is heated by steam introduced through a nozzle 17 to which leads a pipe 18 provided with a control valve 19, the nozzle lying near the bottom of the vessel. The vessel has an overflow pipe 20 near its top and may be drained through a pipe 21 leading to a fitting 22 connected to the bottom of the vessel, flow through the drain pipe being controlled by a valve 23.

The coil has a number of convolutions and passes out through the fitting 22 at the bottom of the tank, its discharge end being provided with a valve 24 operated by the handle 13, the valves 12 and 24 thus being opened and closed in unison. The pitch of the coil and the size of the pipe employed is such that by proper regulation of the control valve 11, the juice entering the funnel when the valves 22 and 24 are opened flows through the coil but without filling the piping. The liquid as illustrated in Fig. 3 may fill approximately half of the piping so that there is an air space above the flowing stream. By this open channel flow, provision is made for the escape of gases and vapors which are driven out of the liquid as the latter is heated, and the gases and vapors flow upwardly through the coil and escape into the atmosphere.

In the operation of the apparatus, the vessel 16 is filled with water and steam turned on until the temperature of the water is at about 180° F., at which temperature the water is maintained throughout operation. The operator is provided with a supply of cans which have been previously sterilized, for example, by means of a steam spray and when a blend is used which includes a sour juice, the required quantity of sugar syrup is placed in each can before it is filled. The operator places a can beneath the discharge end of the coil, and pulls down on the handle 13 opening the valves 12 and 24, and, as the juice flows through the coil, it is heated to a temperature of about 155° to 175° F. and discharged directly into the can. When the can is filled, the operator closes the valves 12 and 24, replaces the full can by an empty one, and opens the valves again. The operation of changing cans takes only a very short time and the filling of the cans is carried on practically continuously with the juice substantially out of contact with the atmosphere at all times following its introduction into the coil.

As soon as a can is filled, it is capped and sealed and then placed with others in a hot water bath or other heating means so that the juice can be maintained at a temperature of from about 160° to 170° for at least 10 to 15 minutes. When removed from the heating bath, the cans are ready to be labeled and shipped and the juice therein will keep fresh and palatable for an indefinite period.

The heating of the juice in the coil with open channel flow is an important feature of the invention and appears to be largely responsible for the preservation of the juice without impairment of its flavor. The use of the sour juice also assists in preservation and I employ a sour juice of such kind and in such amount that the final product has a pH value of 3½ to 6.

In order that the apparatus may function on the open channel flow principle, the funnel leading to the coil should have approximately the same pitch as the coil and I have found that ½ inch tubing may best be used for the coil. Preferably the coil is of tin tubing about 20 feet long and coiled with a 2 inch pitch. The funnel may be of Monel metal and the coil and funnel are supported in the vessel in any convenient manner. The use of the fitting 22 makes it possible to provide the vessel with a single outlet opening at the bottom through which the contents may be drained and the end of the coil may pass. In order that the juice leaving the coil may have the desired temperature, the water bath in the vessel is maintained at a temperature somewhat higher than the desired exit temperature of the juice, the temperature differential depending on the rate of flow. The operating conditions will vary, of course, with the temperature of the juice to be treated but the apparatus may be easily controlled by the operator to obtain the desired results. Preferably the control valves 12 and 24 will be silver-plated inside, the presence of the silver in contact with the juice apparently having a somewhat toxic effect on the organisms present.

I claim:

1. A method of preserving citrus fruit juices which comprises preliminarily heating a flowing stream of the juice while keeping the juice out of contact with the air and permitting the escape of gases and vapors therefrom, the temperature of the juice thus heated ranging from about 155° F. to about 175° F., introducing the heated juice at once into containers, sealing the containers, and maintaining the juice in the containers at its elevated temperature for at least ten minutes.

2. A method of preserving citrus fruit juices which comprises preliminarily heating a flowing stream of the juice while keeping the juice out of contact with the air and permitting the escape of gases and vapors therefrom, the temperature of the juice thus heated ranging from about 155° F. to about 175° F., introducing the heated juice at once into containers, sealing the containers, and maintaining the juice in the containers at a temperature from about 160° F. to about 170° F. for at least ten minutes.

3. A method of preserving citrus fruit juices which comprises preliminarily heating a flowing stream of the juice while keeping the juice out of contact with the air and permitting the escape of gases and vapors therefrom, the temperature of the juice thus heated ranging from about 155° F. to about 175° F., introducing the heated juice at once into containers, sealing the containers, and maintaining the juice in the containers at its elevated temperature for about ten to fifteen minutes.

4. A method of preserving citrus fruit juices which comprises preliminarily raising the flowing stream of juice to a temperature from about 155° F. to about 175° F. while keeping the juice out of contact with the air and permitting the escape of gases and vapors therefrom, said heating requiring about 15 seconds, introducing the heated juice at once into containers, sealing the containers, and maintaining the canned juice in its containers at its elevated temperature for at least ten minutes.

5. A method of preserving citrus fruit juices which comprises producing a blend of said juice with a relatively small quantity of sour orange juice, preliminarily heating a flowing stream of the mixed juices while keeping the juice out of contact with the air and permitting the escape of gases and vapors therefrom, the temperature of the juice thus heated ranging from about 155° F. to about 175° F., introducing the heated juice at once into containers, sealing the containers, and maintaining the juice in the containers at its elevated temperature for at least ten minutes.

HAROLD H. BROWNE.